US011354838B2

(12) United States Patent
Matsuzawa

(10) Patent No.: US 11,354,838 B2
(45) Date of Patent: Jun. 7, 2022

(54) FIELD INFORMATION MANAGEMENT DEVICE, FIELD INFORMATION MANAGEMENT SYSTEM, FIELD INFORMATION MANAGEMENT METHOD, AND FIELD INFORMATION MANAGEMENT PROGRAM

(71) Applicant: Topcon Corporation, Tokyo (JP)

(72) Inventor: Koki Matsuzawa, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 16/798,363

(22) Filed: Feb. 22, 2020

(65) Prior Publication Data

US 2020/0273223 A1 Aug. 27, 2020

(30) Foreign Application Priority Data

Feb. 25, 2019 (JP) .............................. JP2019-031898

(51) Int. Cl.
*G06T 11/40* (2006.01)
*A01C 21/00* (2006.01)
*G06T 11/00* (2006.01)

(52) U.S. Cl.
CPC ............ *G06T 11/40* (2013.01); *A01C 21/007* (2013.01); *G06T 11/00* (2013.01)

(58) Field of Classification Search
None
See application file for complete search history.

(56) References Cited

U.S. PATENT DOCUMENTS

| 9,843,277 | B2 | 12/2017 | Yamada | |
|---|---|---|---|---|
| 2014/0189576 | A1* | 7/2014 | Carmi | G06K 9/6204 715/781 |
| 2014/0297242 | A1* | 10/2014 | Sauder | G06F 30/20 703/6 |
| 2015/0279026 | A1* | 10/2015 | Hall | G06K 9/00 382/128 |
| 2016/0141981 | A1 | 5/2016 | Yamada | |
| 2016/0210768 | A1* | 7/2016 | Yoo | G06T 3/40 |
| 2016/0291590 | A1* | 10/2016 | Kuniyasu | G06Q 50/02 |
| 2016/0358369 | A1* | 12/2016 | Takaya | G06T 15/20 |
| 2017/0289458 | A1* | 10/2017 | Song | H04N 5/23296 |
| 2017/0332019 | A1* | 11/2017 | Ishihara | H04N 5/77 |
| 2017/0358106 | A1* | 12/2017 | Yoshimura | G01J 3/51 |
| 2018/0322197 | A1* | 11/2018 | Hester | B61L 3/002 |
| 2019/0347836 | A1* | 11/2019 | Sangireddy | A01C 21/00 |
| 2020/0012667 | A1* | 1/2020 | Hill | G06Q 40/10 |

FOREIGN PATENT DOCUMENTS

JP 2016-100930 A 5/2016

\* cited by examiner

*Primary Examiner* — YuJang Tswei
(74) *Attorney, Agent, or Firm* — Chiesa Shahinian & Giantomasi PC

(57) ABSTRACT

Provided are a field display device and the like capable of displaying a plurality of fields to be displayed on a screen reliably and immediately. A field information management device is configured such that: a plurality of fields for cultivating plants can be displayed on a main screen, and a plurality of pieces of character information related to the fields that can be displayed on the main screen can be displayed on a sub-screen simultaneously with the main screen; and shape information of each of the fields that can be displayed on the main screen is displayed on the sub-screen together with the character information related to the corresponding field.

5 Claims, 21 Drawing Sheets

FIG. 6

- 120
  - 121 — SUB-SCREEN FIELD DISPLAY CHANGING UNIT (WHEN FIELD SHAPES ARE SAME AND ARE IN SIMILAR RELATION, AND DIFFERENCE BETWEEN LARGEST FIELD AND SMALLEST FIELD IS OUTSIDE CERTAIN RANGE, THIS FIELDS ARE DISPLAYED ON SUB-SCREEN WHILE DECREASING PREDETERMINED REDUCTION RATIO)
  - 122 — FIELD OUTLINE CHANGING UNIT (CHANGE OUTLINE OF FIELD ON "MAIN SCREEN" CORRESPONDING TO SELECTED FIELD ON "SUB-SCREEN" TO LINE DIFFERENT FROM OUTLINE OF NON-SELECTED FIELD)
  - 123 — SUB-SCREEN OUTLINE CHANGING UNIT (WHEN OUTLINE OF FIELD ON MAIN SCREEN IS CHANGED, CHANGE SHAPE OF CORRESPONDING FIELD ON SUB-SCREEN)
  - 124 — FIELD RECEPTION INFORMATION EXTRACTION UNIT (EXTRACT AND STORE "RECEPTION INFORMATION" WITHIN RANGE OF LATITUDE AND LONGITUDE OF SELECTED FIELD FROM "SERVER-SIDE LASER RECEPTION INFORMATION STORAGE UNIT")
  - 125 — FIELD RECEPTION INFORMATION STORAGE UNIT (STORE "RECEPTION INFORMATION" WITHIN RANGE OF LATITUDE AND LONGITUDE OF SELECTED FIELD)

132 — VEGETATION INDEX CALCULATION FORMULA STORAGE UNIT (STORE "VEGETATION INDEX (NDVI) = (IR − R)/(IR + R)")

131 — VEGETATION INDEX CALCULATION UNIT (REFER TO "RECEPTION INFORMATION", SUBSTITUTE SAME IN CALCULATION FORMULA STORED IN "VEGETATION INDEX CALCULATION FORMULA STORAGE UNIT" TO CALCULATE AND STORE "VEGETATION INDEX INFORMATION" OF EACH REGION OF FIELD)

133 — FIELD REGION VEGETATION INFORMATION STORAGE UNIT (STORE "VEGETATION INDEX INFORMATION" OF EACH REGION OF FIELD)

134 — PROTRUSION CHECKING UNIT (DETERMINE WHETHER "VEGETATION INDEX INFORMATION" OF FIELD STORED IN "FIELD REGION VEGETATION INFORMATION STORAGE UNIT" IS WITHIN OUTLINE OF "FIELD CONTOUR POSITION INFORMATION" OF FIELD, AND IF NOT, REMOVE "VEGETATION INDEX INFORMATION" OF FIELD OUTSIDE OUTLINE OF "FIELD CONTOUR POSITION INFORMATION" OF FIELD, AND STORE SAME AS CORRECTED VEGETATION INDEX INFORMATION IN "CORRECTED VEGETATION INDEX INFORMATION STORAGE UNIT")

135 — CORRECTED VEGETATION INDEX INFORMATION STORAGE UNIT (STORE CORRECTION VEGETATION INDEX INFORMATION)

140
141 — CULTIVATION MAP GENERATION UNIT (REFER TO "CORRECTED VEGETATION INFORMATION", CLASSIFY CULTIVATION STATE INTO "GOOD", "MODERATE", AND "POOR" DEPENDING ON EXTENT OF CULTIVATION STATE, AND DISPLAY SAME ON "MAIN SCREEN" BY ASSIGNING "DARK RED", "STANDARD RED", AND "LIGHT RED", RESPECTIVELY)

142 — FERTILIZATION MAP GENERATION UNIT (REFER TO "CORRECTED VEGETATION INFORMATION", CLASSIFY CULTIVATION STATE INTO "GOOD", "MODERATE", AND "POOR" DEPENDING ON EXTENT OF CULTIVATION STATE, AND DISPLAY SAME ON "MAIN SCREEN" BY ASSIGNING "DARK RED", "STANDARD RED", AND "LIGHT RED" AS "SMALL FERTILIZATION AMOUNT", "STANDARD FERTILIZATION AMOUNT", AND "LARGE FERTILIZATION AMOUNT", RESPECTIVELY)

FIG. 8

FIELD INFORMATION MANAGEMENT DEVICE, FIELD INFORMATION MANAGEMENT SYSTEM, FIELD INFORMATION MANAGEMENT METHOD, AND FIELD INFORMATION MANAGEMENT PROGRAM

CROSS-REFERENCE TO RELATED APPLICATIONS

This application is based upon and claims benefit of priority from Japanese Patent Application No. 2019-031898, filed Feb. 25, 2019, the disclosure of which is incorporated herein by reference in its entirety.

TECHNICAL FIELD

The present disclosure relates to a field information management device, a field information management system, a field information management method, and a field information management program for displaying fields.

BACKGROUND

Japanese Patent Application Publication No. 2016-100930 describes, for example, a method for displaying borders on a map.

SUMMARY

When a plurality of (particularly, a number of) fields are present in a farm, and the plurality of fields is displayed on a screen, it is difficult to visually recognize a specific field in which a user wants to know a fertilization state or the like on the screen.

Therefore, an object of the present disclosure is to provide a field information management device, a field information management system, a field information management method, and a field information management program capable of displaying a plurality of fields to be displayed on a screen reliably and immediately.

According to an embodiment, the object is achieved by a field information management device configured such that: a plurality of fields for cultivating plants can be displayed on a main screen, and a plurality of pieces of character information related to the fields that can be displayed on the main screen can be displayed on a sub-screen simultaneously with the main screen; and shape information of each of the fields that can be displayed on the main screen is displayed on the sub-screen together with the character information related to the corresponding field.

According to this configuration, since the shape information of each of the fields that can be displayed on the main screen is displayed on the sub-screen together with the character information related to the corresponding field, a user can identify a field that the user wants to select from the fields displayed on the sub-screen immediately and can select the field quickly and reliably.

In one embodiment, when a field displayed on the sub-screen is selected, an outline of the corresponding field displayed on the main screen is displayed in a different line shape different from that of the other non-selected field by the field information management device.

According to this configuration, since the outline of the field selected on the sub-screen is displayed in a line shape different from that of the other non-selected field on the main screen, a user can visually recognize the selected field on the main screen without any temporary hesitation.

In one embodiment, type information of plants cultivated in each field is displayed on the sub-screen, and the fields are displayed in different colors depending on a difference in the type information of the plant on the main screen.

According to this configuration, since fields are displayed in different colors on the main screen depending on a difference in the type information of plants, it is possible to immediately understand the type of a plant cultivated in the field selected on the sub-screen.

In one embodiment, when the field to be displayed on the sub-screen is selected, cultivation information and/or fertilization information is displayed on the corresponding field displayed on the main screen.

According to this configuration, since the cultivation information and/or the fertilization information is displayed on the corresponding field displayed on the main screen, a user can quickly acquire the cultivation information and/or the fertilization information of each field.

In one embodiment, the cultivation information and/or the fertilization information is displayed such that a difference in the extent of cultivation and/or a difference in the extent of a fertilization amount is displayed in a different color.

According to this configuration, since the cultivation information and/or the fertilization information is displayed such that a difference in the extent of cultivation and/or a difference in the extent of a fertilization amount is displayed in a different color, a user can quickly acquire information on the extent of cultivation and/or the extent of a fertilization amount in each region of the field by watching the screen.

According to the present disclosure, the object is achieved by a field information management system including: a terminal device capable of displaying a main screen and a sub-screen; and a field information management device that can communicate with the terminal device, wherein the field information management device is configured such that: a plurality of fields for cultivating plants can be displayed on a main screen of the terminal device, and a plurality of pieces of character information related to the fields that can be displayed on the main screen can be displayed on a sub-screen of the terminal device simultaneously with the main screen; and shape information of each of the fields that can be displayed on the main screen is displayed on the sub-screen together with the character information related to the corresponding field.

According to the present disclosure, the object is achieved by a field information management method including: displaying simultaneously a plurality of fields for cultivating plants on a main screen of a terminal device and displaying a plurality of pieces of character information related to the fields that can be displayed on the main screen on a sub-screen of the terminal device simultaneously with the main screen; and displaying shape information of each of the fields that can be displayed on the main screen on the sub-screen together with the character information related to the corresponding field.

According to the present disclosure, the object is achieved by a field information management program for executing: a function of displaying a field for cultivating plurality of plants on a main screen of a terminal device and a function of displaying a plurality of pieces of character information related to the fields that can be displayed on the main screen on a sub-screen of the terminal device simultaneously with the main screen; and a function of displaying shape information of each of the fields that can be displayed on the main screen on the sub-screen together with the character information related to the corresponding field.

An embodiment of the present disclosure has an advantage that it is possible to provide a field display device, a field display device control method, and a field display device control program capable of displaying a plurality of fields to be displayed on a screen reliably and immediately.

DESCRIPTION OF THE DRAWINGS

FIG. 6 is a schematic block diagram illustrating main components of a second server-side information storage unit 120;

FIG. 7 is a schematic block diagram illustrating main components of a third server-side information storage unit 130;

FIG. 8 is a schematic block diagram illustrating main components of a fourth server-side information storage unit 140;

DETAILED DESCRIPTION

In the following, embodiments of the present invention will be described in detail with reference to the accompanying drawings. Since the embodiments to be described later are specific examples of the present invention, technically various limitations are added. However, the scope of the present disclosure is not limited to these embodiments.

Figure 1:
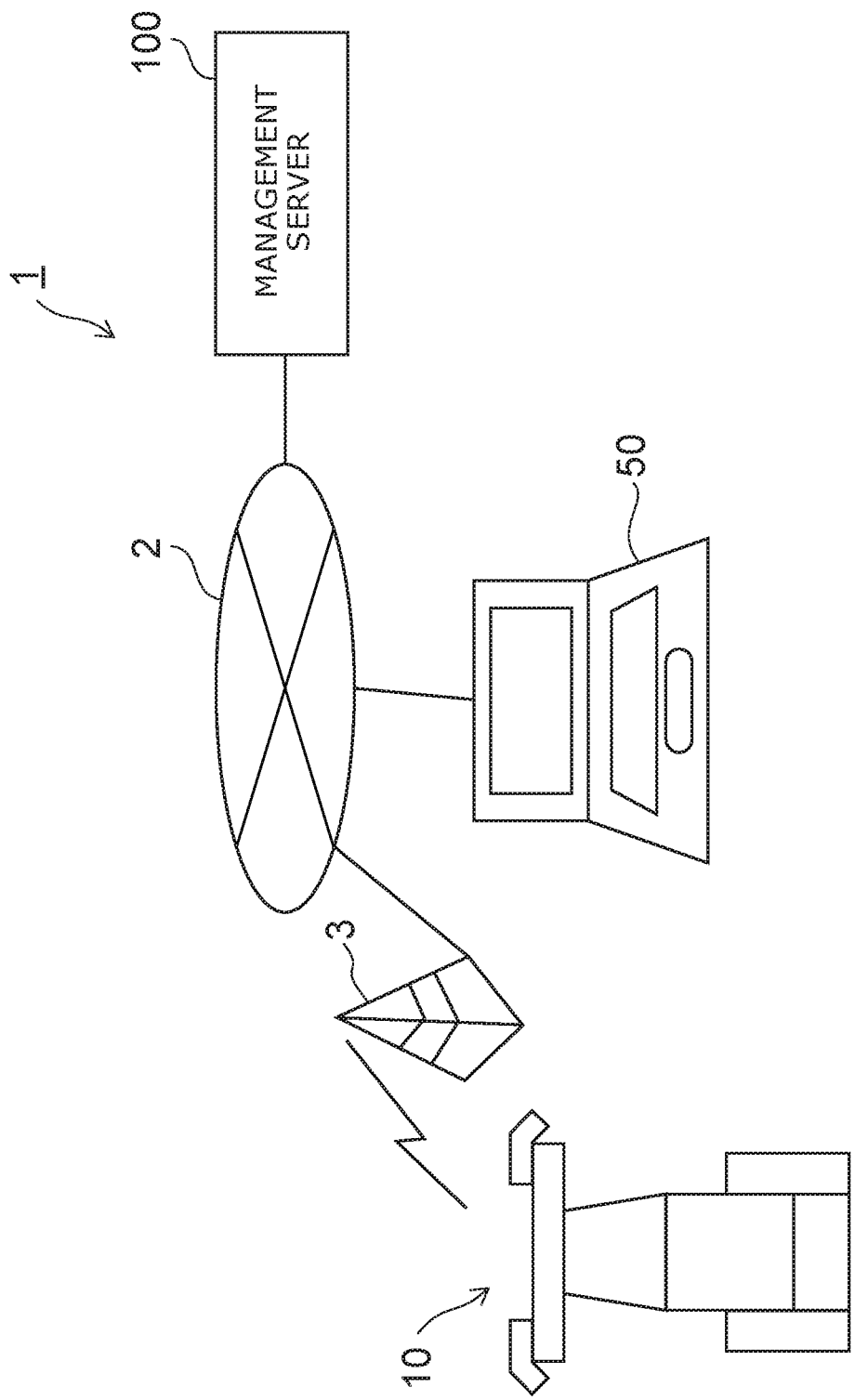
FIG. 1 is a schematic diagram illustrating a field information management system 1 according to the present invention.

FIG. 1 is a schematic diagram illustrating the field information management system 1 according to the present invention. As illustrated in FIG. 1, the system 1 includes a tractor 10 disposed in a farm (for example, an F-farm), a terminal device 50 such as a PC possessed by a farmer or the like of the F-farm, and a management server 100 which, for example, is a field information management device that manages field information. The tractor 10, the terminal device 50, and the management server 100 can communicate with each other via an Internet network 2, a base station 3, and the like, for example.

This system 1, as will be described later provides a service enabling a farmer of the F-farm to visually recognize the state of his/her fields (for example, F-1 to F-5) on a display 53 of the terminal device 50 using the terminal device 50 of the farmer.

The tractor 10, the terminal device 50, and the management server 100 illustrated in FIG. 1 each have a computer. The computer includes a central processing unit (CPU), a random access memory (RAM), a read only memory (ROM), and the like which are not illustrated and which are connected via a bus or the like.

Figure 2:
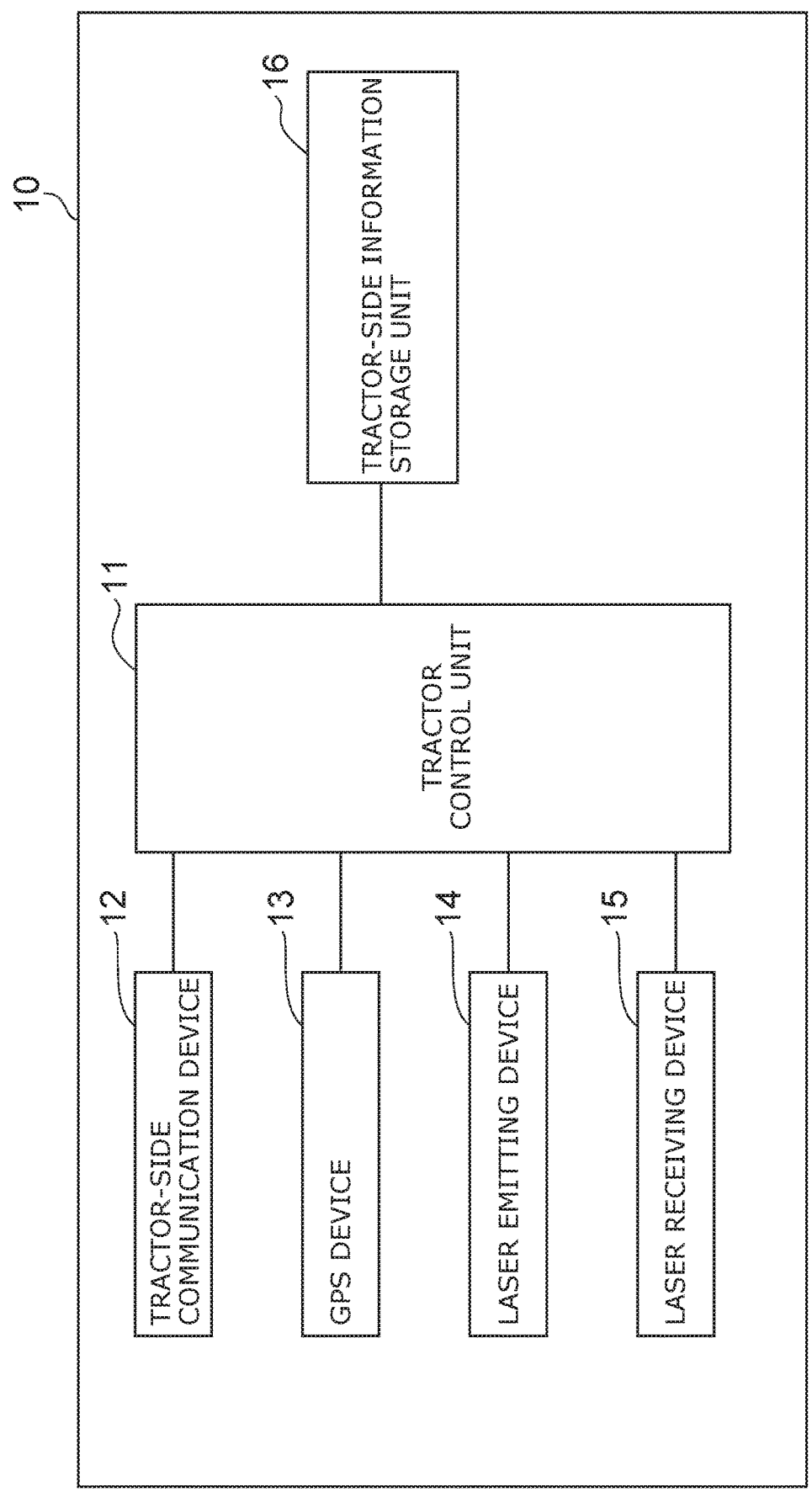
FIG. 2 is a schematic block diagram illustrating main components of a tractor 10 illustrated in FIG. 1.

FIG. 2 is a schematic block diagram illustrating main components of the tractor 10 illustrated in FIG. 1. As illustrated in FIG. 2, the tractor 10 has a "tractor control unit 11", and the tractor control unit 11 controls a "tractor-side communication device 12", a "GPS device 13", a "laser emitting device 14", a "laser receiving device 15", a "tractor-side information storage unit 16", and the like illustrated in FIG. 2.

The "GPS device 13" is a global positioning system and is a device that three-dimensionally measure the position of a radio wave receiver on the earth from the arrival time of the radio waves of time signals emitted by twenty four satellites. Therefore, the GPS device 13 measures the position whereby it is possible to detect the position (the latitude, the longitude, and the like) of the tractor 10 with high accuracy.

Although the present embodiment describes an example of using the tractor 10, the present invention is not limited to this and an unmanned aerial vehicle (UAV) also called a "drone" may be used instead of the tractor 10.

The "laser emitting device 14" is configured to radiate two laser beams (red and infrared beams) having different wavelengths and specifically is configured to radiate laser beams to the same plant on a field (F-1 or the like). The "laser receiving device 15" is configured to receive the reflection beams of the two laser beams radiated by the laser emitting device 14. As will be described later, the cultivation state of the plant (specifically the amount of a nutrient contained in the plant) can be detected on the basis of the reflection beams received by the laser receiving device 15.

Figure 3:
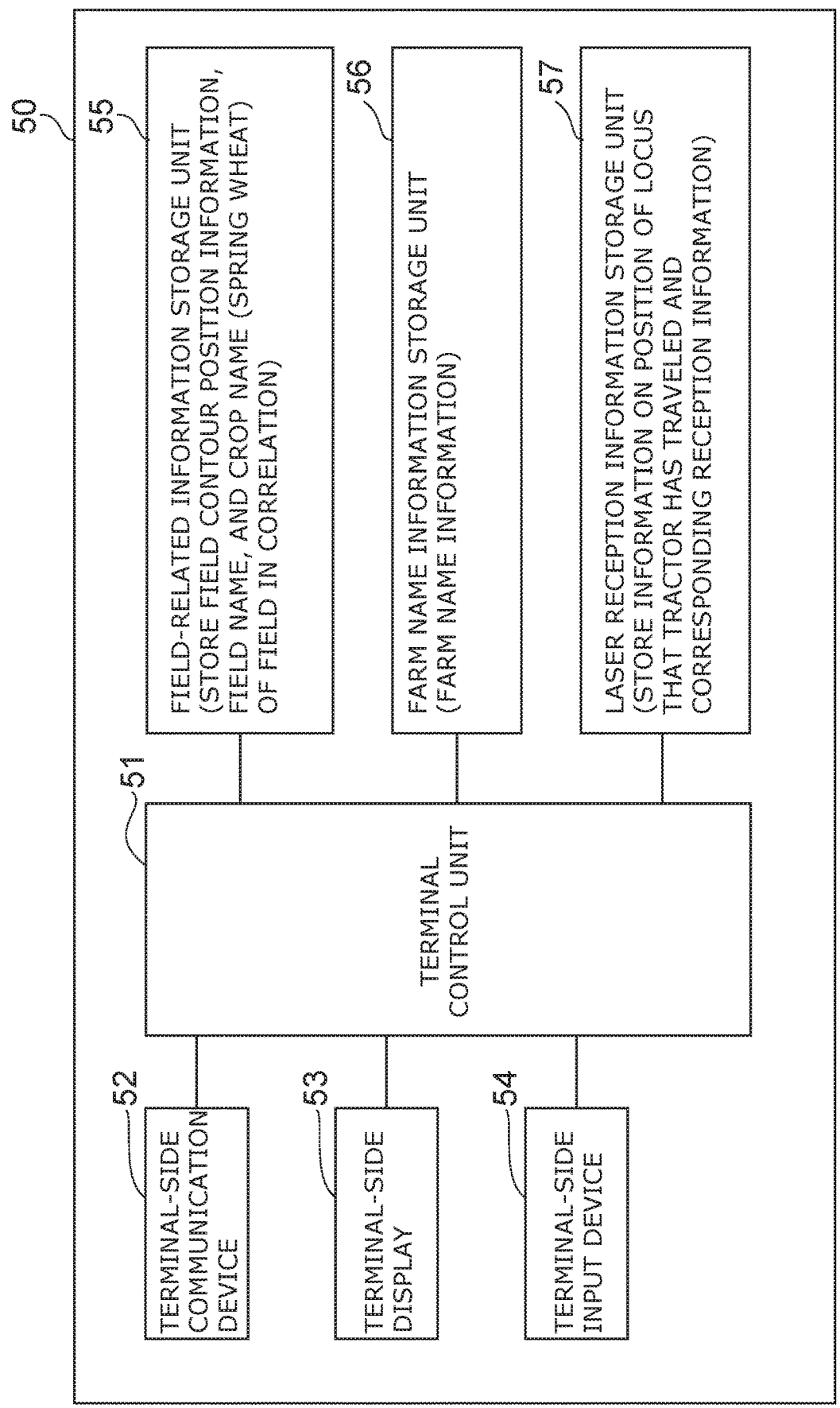
FIG. 3 is a schematic block diagram illustrating main components of a terminal device 50 illustrated in FIG. 1.

FIG. 3 is a schematic block diagram illustrating main components of the terminal device 50 illustrated in FIG. 1. As illustrated in FIG. 3, the terminal device 50 includes a "terminal control unit Si", and the terminal control unit 51 controls a "terminal-side communication device 52", a "terminal-side display 53", a "terminal-side input device 54", a "field-related information storage unit 55", a "farm name information storage unit 56", and a "laser reception information storage unit 57" illustrated in FIG. 3. Here, the details of the "field-related information storage unit 55", the "farm name information storage unit 56", the "laser reception information storage unit 57", and the like will be described later.

Figure 4:
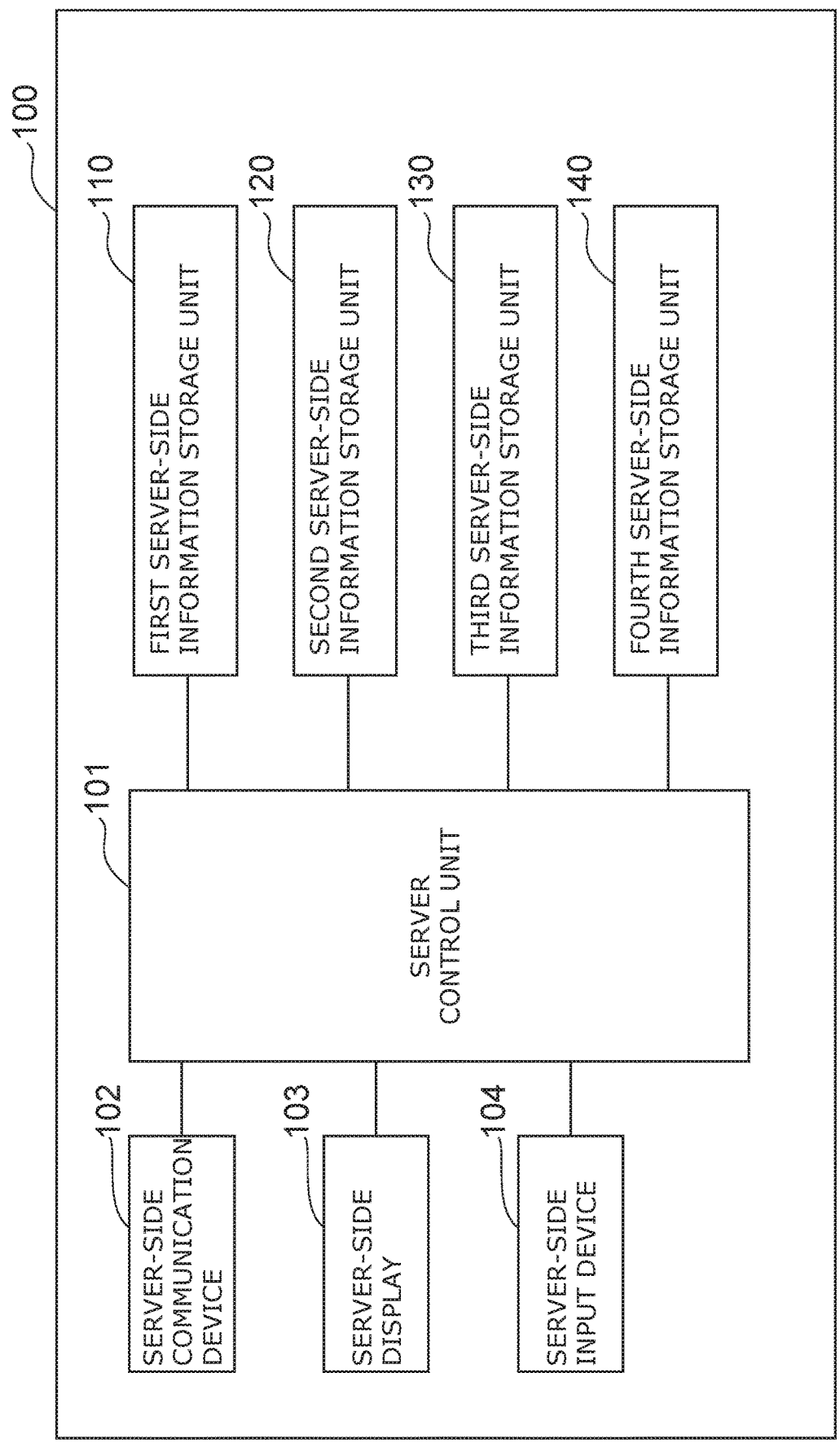
FIG. 4 is a schematic block diagram illustrating main components of a management server 100 illustrated in FIG. 1.

FIG. 4 is a schematic block diagram illustrating main components of the management server 100 illustrated in FIG. 1. As illustrated in FIG. 4, the management server 100 includes a "server control unit 101", and the server control unit 101 controls a "server-side communication device 102", a "server-side display 103", a "server-side input device 104", a "first server-side information storage unit 110", a "second server-side information storage unit 120", a "third server-side information storage unit 130", and a "fourth server-side information storage unit 140" illustrated in FIG. 4.

FIGS. 5 to 8 are schematic block diagrams illustrating main components of the "first server-side information storage unit 110", the "second server-side information storage unit 120", the "third server-side information storage unit 130", and the "fourth server-side information storage unit 140", respectively. The details of these storage units will be described later.

Figure 9:
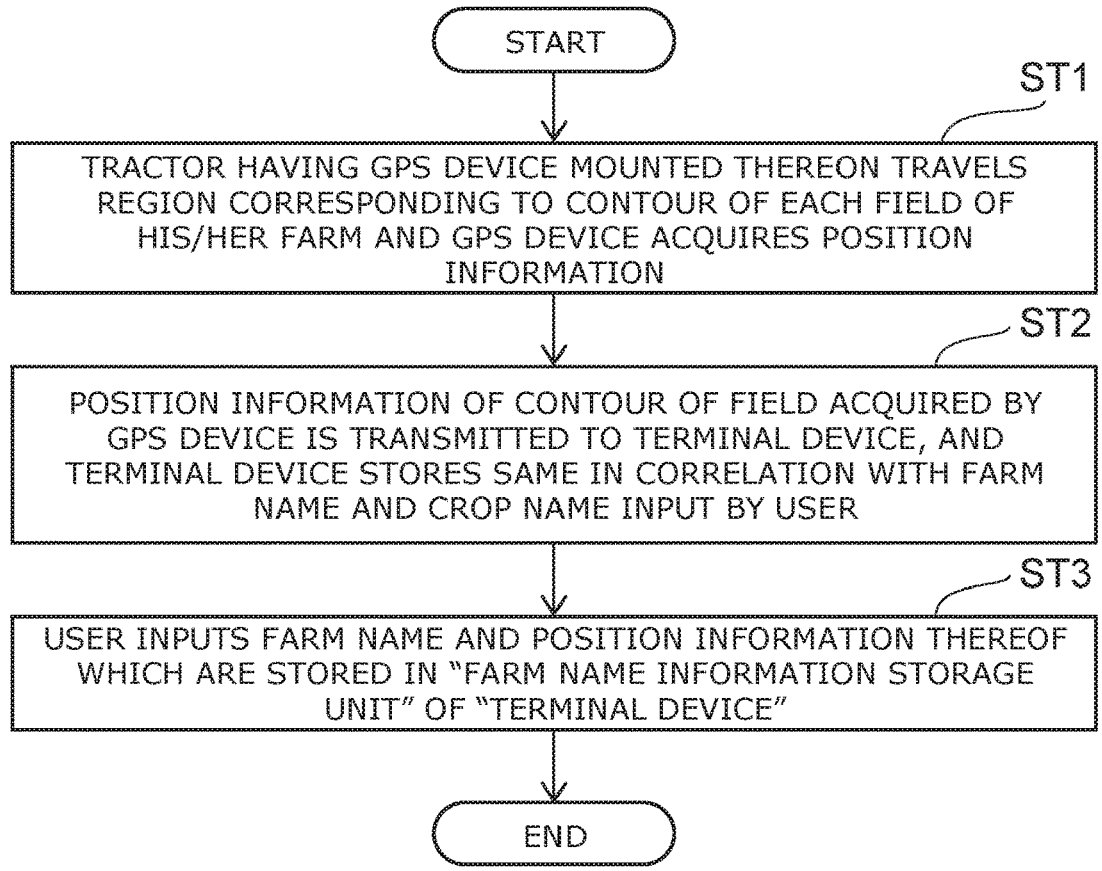
FIG. 9 is a schematic flowchart illustrating steps for forming an outline (contour) which is the shape of each field (F-1 to F-5) of an F-farm.

FIGS. 9 to 16 are schematic flowcharts illustrating main operations of the field information management system 1 according to an embodiment. In an embodiment, although the information on the fields (F-1 to F-5) of the F-farm is displayed on the display 53 of the terminal device 50, FIGS. 9 to 11 will be described as a preliminary step. FIG. 9 is a schematic flowchart illustrating steps for forming an outline (contour) which is the shape of each field (F-1 to F-5) of the F-farm. First, as illustrated in step 1 (hereinafter "ST"), a user (an employer of the F-farm) actually travels a region corresponding to the contour (the shape, the outline, or the border) of each field (F-1 to F-5) of the F-farm using the tractor 10 illustrated in FIG. 1, and the GPS device 13 acquires the position information (the latitude, the longitude, and the like).

Subsequently, the flow proceeds to ST2. In ST2, the position information (the latitude, the longitude, and the like) of the contours (outlines) of the fields (F-1 to F-5) acquired by the GPS device 13 is transmitted to the terminal device 50, and the terminal device 50 stores the position information in the "field-related information storage unit 55" in FIG. 3 in correlation with a field name (F-1 or the like) input by the user and a crop name (spring wheat) cultivated in the field.

Subsequently, the user inputs a farm name (F-farm or the like) and the position information (the latitude, the longitude, and the like) thereof and stores these pieces of information in the "farm name information storage unit 56" in FIG. 3. In this way, collection of basis information necessary for creating the contour (shape or the like) of each field (F-1 and the like) of the F-farm ends.

Figure 10:
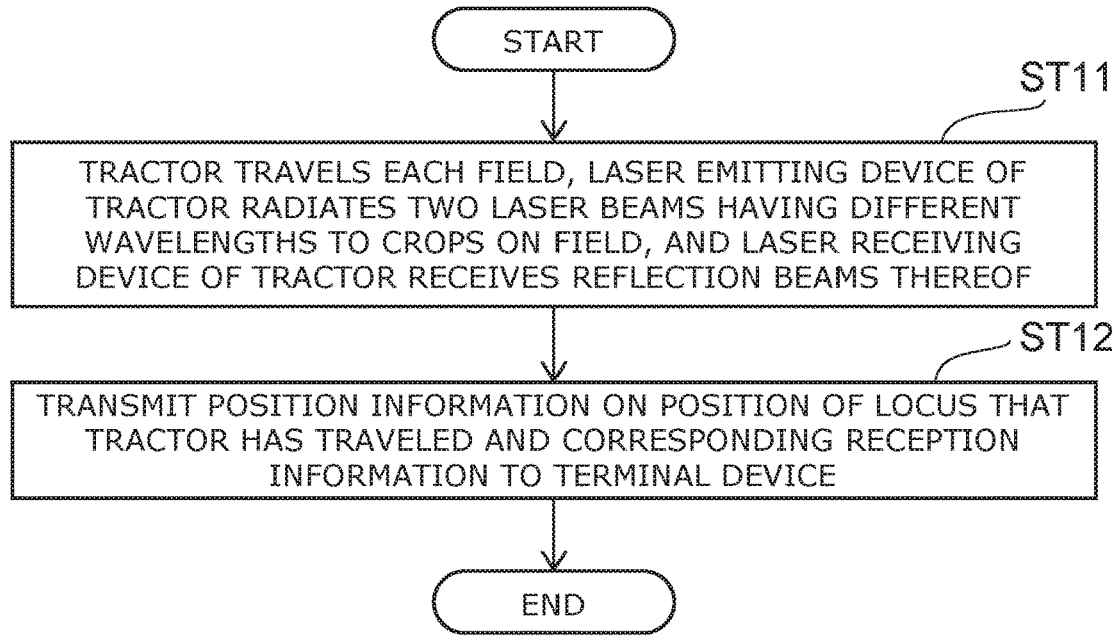
FIG. 10 is a schematic flowchart illustrating steps of collecting information such as a cultivation state of plants such as crops.

Subsequently, steps of collecting information such as a cultivation state or the like of plants such as crops cultivated in each field (F-1 or the like) of the F-farm. FIG. 10 is a schematic flowchart illustrating the steps of collecting information such as a cultivation state or the like of plants such as crops. In ST11 of FIG. 10, the tractor 10 travels each field (F-1 and the like) of the F-farm, the laser emitting device 14 of the tractor 10 radiates two laser beams of different wavelengths to crops on the field (F-1 or the like), and the laser receiving device 15 of the tractor 10 receives the reflection beams.

Subsequently, the flow proceeds to ST12. In ST12, the position information (the latitude, the longitude, and the like) of a region that the tractor 10 has traveled and the corresponding reception information (the reflection beams) are transmitted to the terminal device 50, and the terminal device 50 stores these pieces of information in the laser reception information storage unit 57 in FIG. 3.

In this way, collection of information such as a cultivation state of plants such as crops cultivated in each field (F-1 and the like) of the F-farm ends.

Figure 11:
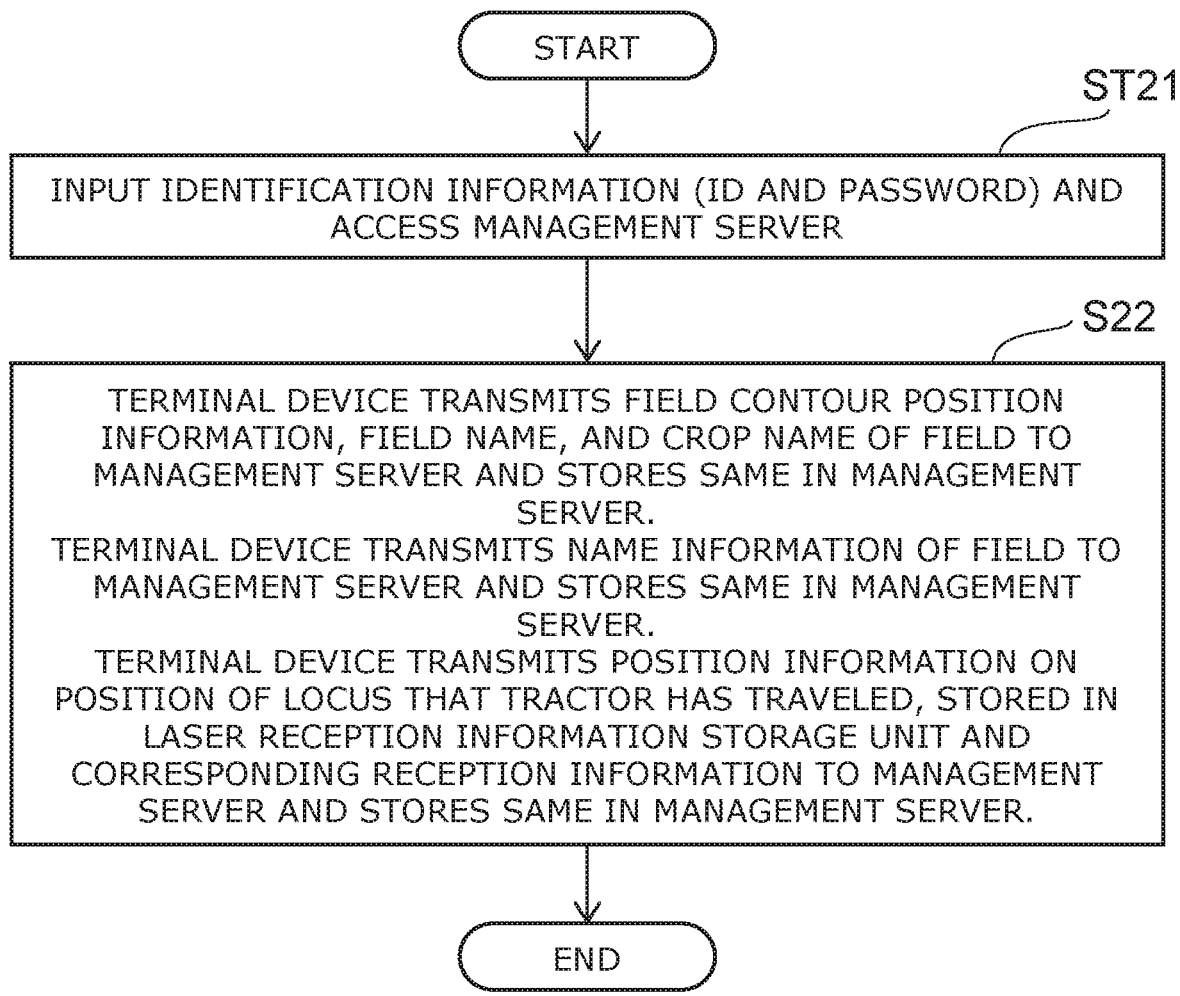
FIG. 11 is a schematic flowchart illustrating steps of transmitting information of the terminal device 50 to the management server 100.

Subsequently, the employer of the F-farm applies a request for using the "field information management system 1" illustrated in FIG. 1 and acquires an ID and a password, for example, which are identification information. The steps of transmitting information and the like for using this system 1 to the management server 100 will be described. FIG. 11 is a schematic flowchart illustrating the steps of transmitting information of the terminal device 50 to the management server 100.

First, in ST21, the user inputs identification information (ID and password) from the terminal device 50 and accesses the management server 100. Subsequently, the flow proceeds to ST22. In ST22, the terminal device 50 transmits field contour position information (the latitude, the longitude, and the like), a field name (field F-1 or the like), and a crop name (spring wheat or the like) of the field (F-1 or the like) stored in the "field-related information storage unit 55" in FIG. 3 to the management server 100. The management server 100 stores these pieces of information in a "server-side field-related information storage unit 111" in FIG. 5.

The terminal device 50 transmits name information (F-farm or the like) of the farm stored in the "farm name information storage unit 56" in FIG. 3 to the management server 100 and stores the information in a "server-side farm name information storage unit 112" of the management server 100. Furthermore, the terminal device 50 transmits the position information (the latitude, the longitude, and the like) of a region that the tractor 10 has traveled, stored in the "laser reception information storage unit 57" in FIG. 3 and the corresponding reception information (reflection beams) to the management server 100 and stores these pieces of information in a "server-side laser reception information storage unit 113" of the management server 100 in FIG. 5. In this way, the steps of transmitting the information of the terminal device 50 1 to the management server 100 ends.

Figure 12:
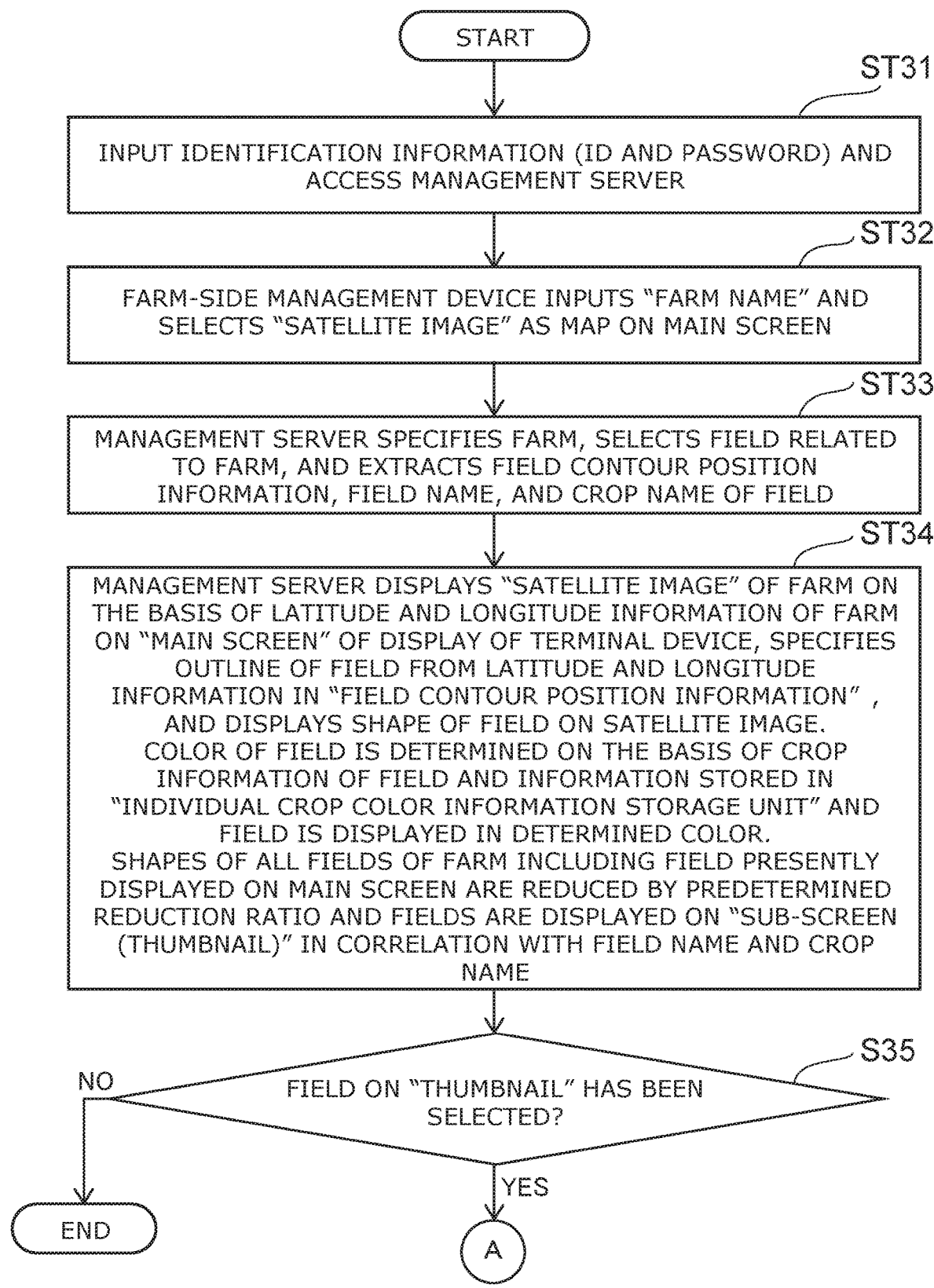
FIG. 12 is a schematic flowchart illustrating steps of displaying information of a field (F-1 and the like)
Figure 13:
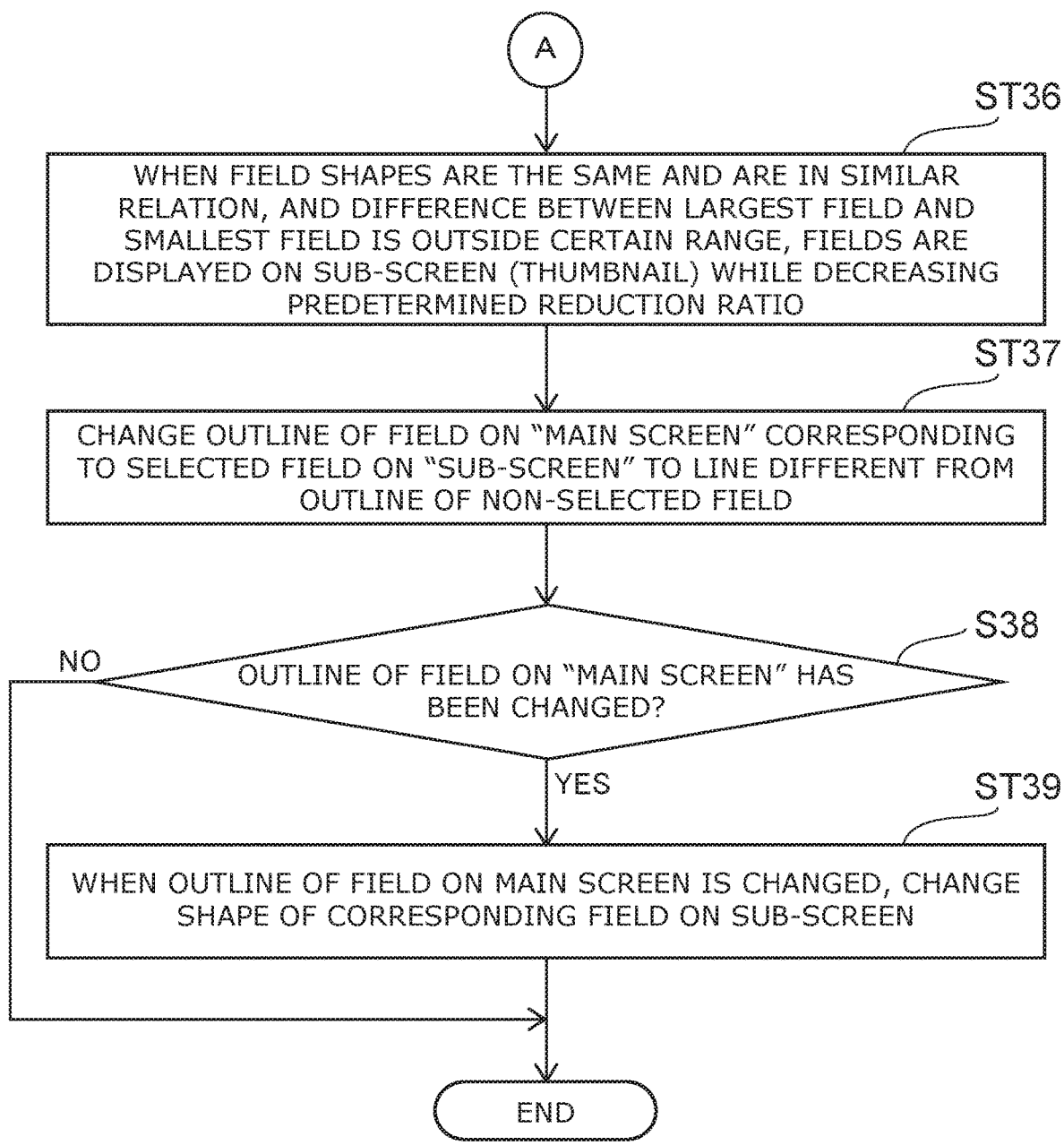
FIG. 13 is another schematic flowchart illustrating steps of displaying information of a field (F-1 and the like)

Subsequently, the steps in which the user displays the information and the like of the field (F-1 or the like) of his/her F-farm on the display 53 of the terminal device 50 will be described. FIGS. 12 and 13 are schematic flowcharts illustrating the steps of displaying the information and the like of the field (F-1 or the like). In ST31 of FIG. 12, the user inputs identification information (ID and password) to the terminal device 50 and accesses the management server 100.

Subsequently, the flow proceeds to ST32. In ST32, a "farm name" is input to the terminal device 50 and a "satellite image" is selected as the map of a "main screen" to be displayed on the terminal-side display 53. A "map" illustrated in the drawings may be selected instead of the "satellite image".

Subsequently, the flow proceeds to ST33. In ST33, a "farm and field outline display unit (program) 114" in FIG. 5 of the management server 100 operates to specify the farm in the "server-side farm name information storage unit 112", select a field related to the farm from the "server-side field-related information storage unit 111", and extract the field contour position information (the latitude, the longitude, and the like), the field name (field F-1 or the like), and a crop name of the field.

Subsequently, the flow proceeds to ST34. In ST34, the management server 100 displays the "satellite image" of the farm on the "main screen" of the terminal-side display of the terminal device 50 on the basis of the latitude and longitude information of the farm, specifies the outline of the field from the latitude and longitude information of the "field contour position information", and displays the shape of the field on the satellite image.

Figure 17:
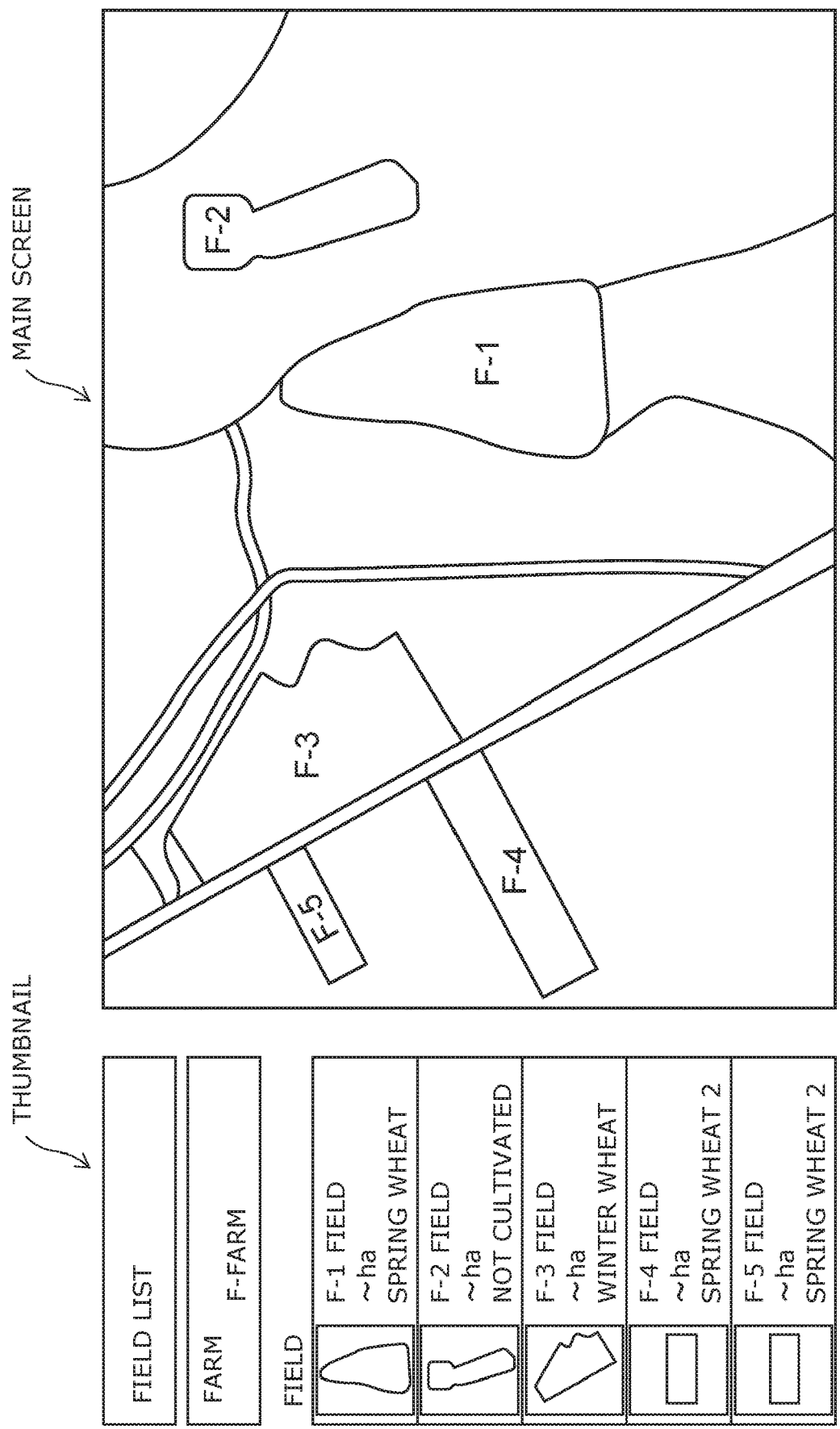
FIG. 17 is an example of a screen showing a field list displayed on a terminal-side display 53.

FIG. 17 is an example of a screen showing a field list displayed on the terminal-side display 53. As illustrated in FIG. 17, the shape of the field (F-1 or the like) is displayed on the main screen so as to be superimposed on the satellite image of the F-farm.

Figure 5:
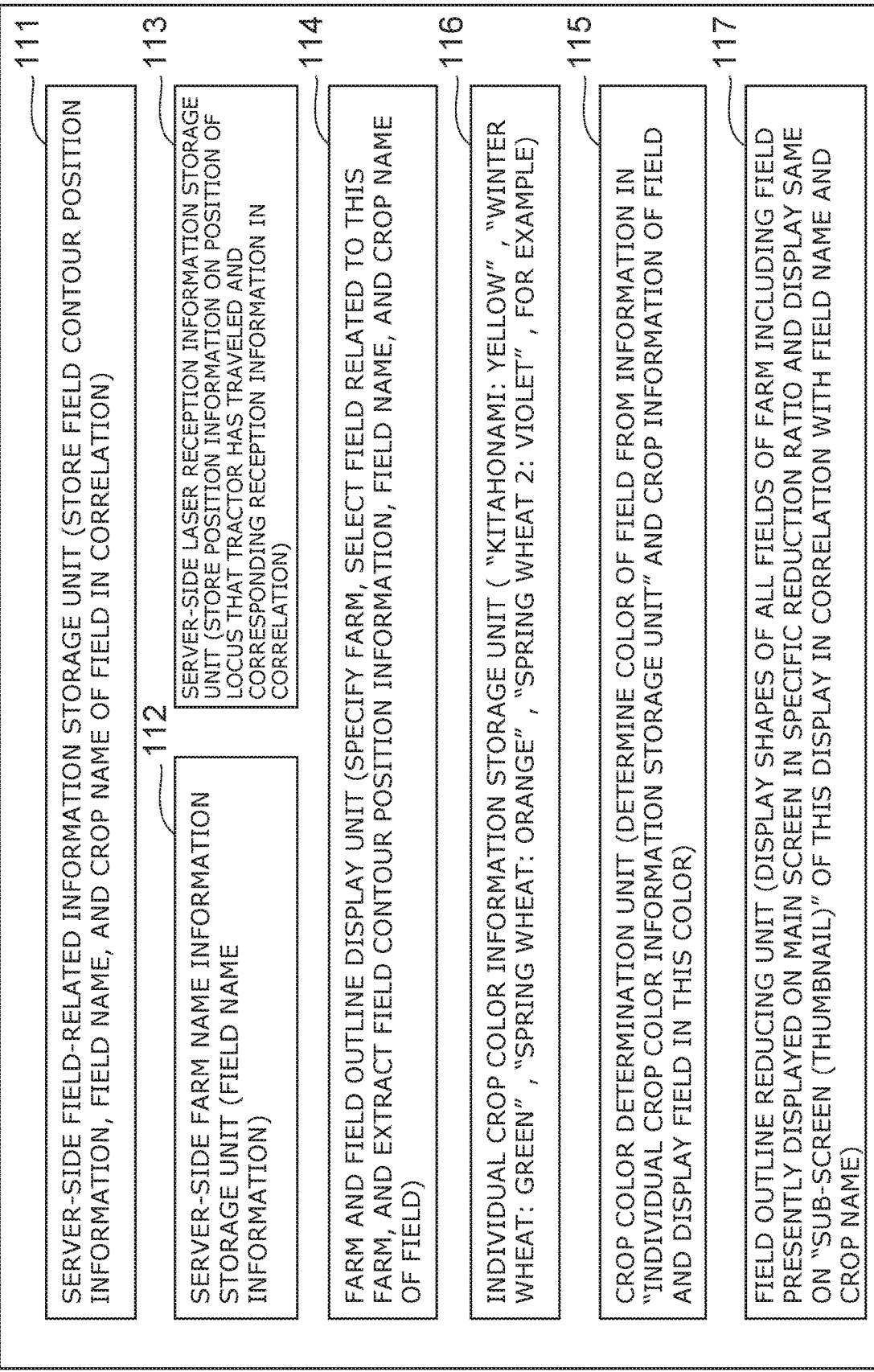
FIG. 5 is a schematic block diagram illustrating main components of a first server-side information storage unit 110.

A "crop color determination unit (program) 115" in FIG. 5 operates to determine the color of the field on the basis of the information stored in an "individual crop color information storage unit 116" in FIG. 5 and crop information of the field and display the field in the color. That is, the type information of a plant (for example, a crop) and the color information of the crop are stored in the "individual crop color information storage unit 116" in correlation. Specifically, the colors are determined such that "Kitahonami: yellow", "winter wheat: green", "spring wheat: orange", "spring wheat 2: violet", for example. In the example of FIG. 17, the F-1 field corresponds to a spring wheat and is therefore displayed in the color "orange", the F-2 field is not cultivated and is therefore displayed in a colorless state, the F-3 field corresponds to a winter wheat and is therefore displayed in the color "green", the F-4 field corresponds to the spring wheat 2 and is therefore displayed in the color "violet", and the F-5 field also corresponds to the spring wheat 2 and is therefore displayed in the color "violet".

A "field outline reducing unit (program) 117" operates such that the shapes of all fields of the farm including the fields (F-1 and the like) actually displayed on the main screen are reduced by a predetermined reduction ratio and are displayed on a "sub-screen (thumbnail)" of the display 53 in correlation with the names (F-1 and the like) and the crop names. Specifically, as illustrated in the thumbnail screen in FIG. 17, the shape of each field is reduced and displayed together with the name (F-1 or the like), the size (ha), and the crop type (spring wheat or the like).

Therefore, the user watching the screen in FIG. 17 can immediately identify the respective fields (F-1 and the like) of his/her F-farm by the "field shape" displayed in the thumbnail and can select the field quickly and reliably.

Subsequently, the flow proceeds to ST35. In ST35, the user determines whether the user has selected a field in the "thumbnail" screen. Specifically, it is determined whether any one of the fields displayed in the thumbnail in FIG. 17 has been selected. When any one of the fields is selected, the flow proceeds to ST36. In ST36, a "sub-screen field display changing unit (program) 121" in FIG. 6 operates to determine whether the shapes of the selected fields are the same and are in a similar relation. Specifically, this is the case where the F-4 field and the F-5 fields in FIG. 17 are selected.

When the field shapes are in a similar relation, and a difference between the largest field and the smallest field is outside a certain range, the fields are displayed on the sub-screen (thumbnail) while decreasing the predetermined reduction ratio. That is, if the F-4 field and the F-5 field in FIG. 17, for example, are reduced by the same reduction ratio, the F-5 field to be displayed in the thumbnail becomes too small. Therefore, in the present embodiment, when the field shapes are similar, the fields are displayed in the same size as illustrated in the thumbnail in FIG. 17.

However, when the user has selected the F-4 field and the F-5 field in FIG. 17, these fields are important. Therefore, in the present embodiment, exceptionally, the F-5 field is displayed on the thumbnail in a reduction ratio that is not too small so that a difference in the size from the F-4 field can be identified at a glance.

Figure 18:
FIG. 18 is an example of a screen in which the size of "F-5 field" on a thumbnail is adjusted.

FIG. 18 is an example of a screen in which the size of the "F-5 field" on the thumbnail is adjusted. As illustrated in FIG. 18, the sizes of the F-4 and F-5 fields on the thumbnail are adjusted to an extent that the difference can be identified clearly and the size of the F-5 field is not too small.

Therefore, the user having selected the F-4 and F-5 fields can perform processing while recognizing the shapes of both fields and the difference in size, and the screen is displayed in a user-friendly manner.

In the present embodiment, fields having similar shapes are displayed while changing the reduction ratio. However, the present invention is not limited thereto and the fields may be displayed in a specific direction (for example, sequentially from the north) and an individual identification mark may be assigned to each outline of the fields displayed on the thumbnail.

Subsequently, the flow proceeds to ST37. In ST37, a "field outline changing unit (program) 122" in FIG. 6 operates to change the outline (shape) of a field on the "main screen" corresponding to the selected field on the "thumbnail" to a line (for example, a bold line or the like) different from the outline of a non-selected field.

Figure 19:
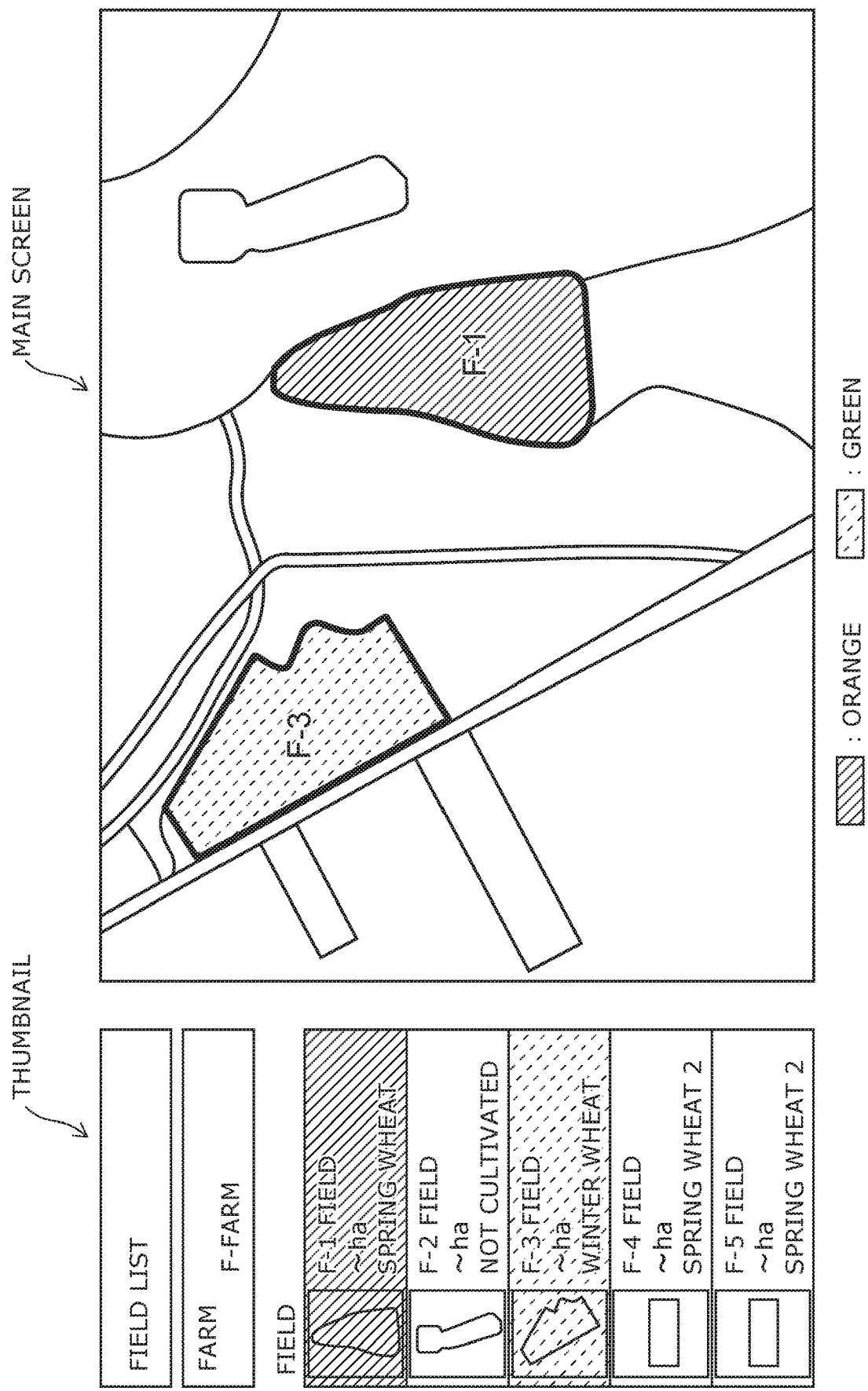
FIG. 19 is an example of a screen in which an outline of the shape of a field on a main screen selected on a thumbnail is a bold line.

FIG. 19 is an example of a screen in which an outline of the shape of a field on the main screen selected on the thumbnail is a bold line. As illustrated in FIG. 19, since the F-1 field and the F-3 field are selected on the thumbnail, the outlines of the shapes of the F-1 and F-3 fields are displayed thicker than the outlines of the other fields on the main screen.

In this way, a field selected on the thumbnail can be clearly distinguished from other fields and the user watching the screen can identify the selected field without any temporary hesitation.

The colors of the selected fields in FIG. 19 (for example, orange for the F-1 field and green for the F-3 field) may be changed by increasing the saturation and the intensity of the colors to be higher than those of the same colors of the other fields so that the fields are more emphasized. The field selected on the thumbnail may be represented by the color of a crop as illustrated in FIG. 19. By adding these features, the user can identify the selected fields more easily.

In the present embodiment, the user can freely change the outline of the shape of the field on the main screen in FIG. 19 and the like. The flow proceeds to ST38. In ST38, it is determined whether the user has changed the outline of the shape of a field (F-1 or the like) displayed on the main screen. When the user has changed the outline, the flow proceeds to ST39. In ST39, a "sub-screen outline changing unit (program) 123" in FIG. 6 operates to change the shape of the field on the sub-screen (thumbnail) corresponding to the field changed on the main screen similarly.

Figure 20:
FIG. 20 is an example of a screen in which the shape of a field is changed.

FIG. 20 is an example of a screen in which the shape of a field is changed. The shape of the F-1 field on the main screen in FIG. 20 is changed as indicated by an arrow. Therefore, the shape of the corresponding F-1 field on the thumbnail is also changed and stored similarly. Therefore, when it is necessary to change the shape of a field, the user can change the shape of the field on the thumbnail with a simple operation. The system 1 is user-friendly.

In this way, in the present embodiment, the user can identify the respective fields (F-1 and the like) of his/her F-farm shown on the main screen and the thumbnail (sub-screen) and can perform processing easily.

Figure 14:
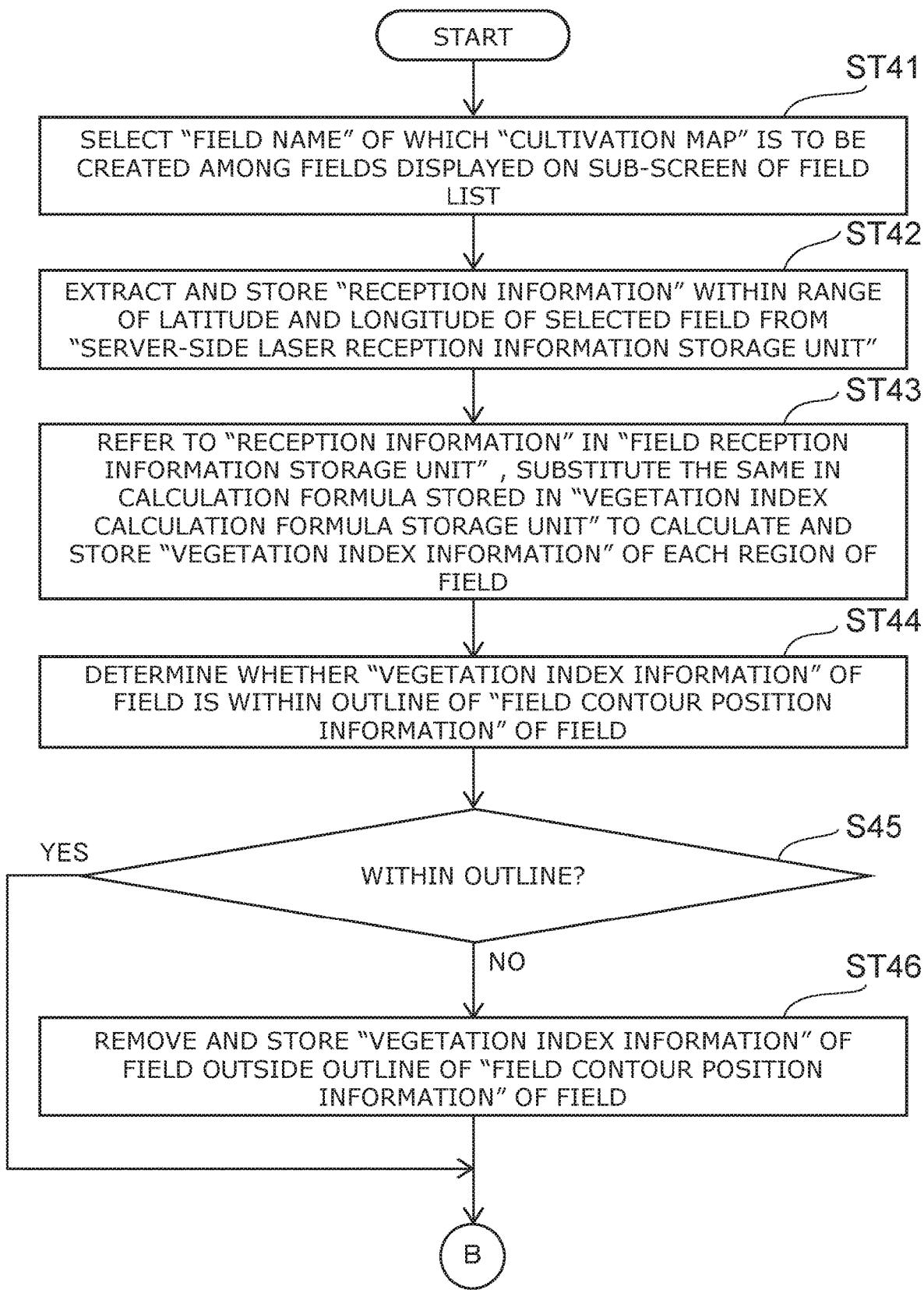
FIG. 14 is a schematic flowchart illustrating steps of creating a cultivation map of a field.
Figure 15:
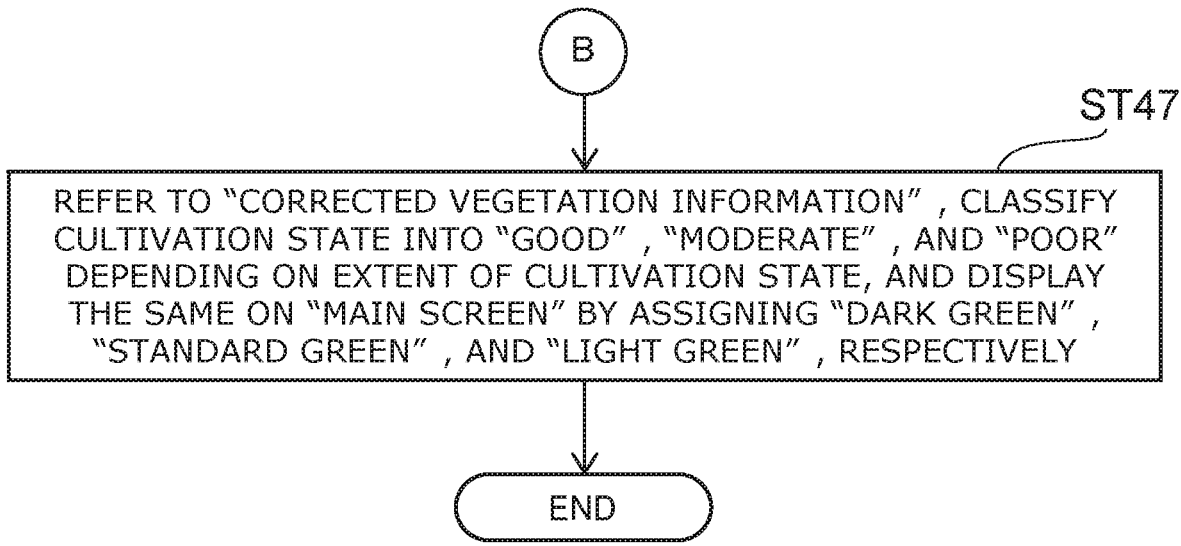
FIG. 15 is another schematic flowchart illustrating steps of creating a cultivation map of a field.

Next, the steps of creating a cultivation map indicating a cultivation state of a field (F-1 or the like) displayed on the main screen will be described. FIGS. 14 and 15 are schematic flowcharts illustrating the steps of creating a cultivation map of a field. In ST41 of FIG. 14, the user selects a "field name (F-1 or the like)" of which the "cultivation map" is to be created among the fields displayed on the sub-screen (thumbnail) of the field list.

Subsequently, the flow proceeds to ST42. In ST42, a "field reception information extraction unit (program) 124" in FIG. 6 operates to extract "reception information" within the range of the latitude and the longitude of the selected field (F-1) from the "server-side laser reception information storage unit 113" in FIG. 5 and stores the reception information in the "field reception information storage unit 125" in FIG. 6.

Subsequently, the flow proceeds to ST43. In ST43, a "vegetation index calculation unit (program) 131" in FIG. 7 operates to refer to the "reception information (reflectivities (IR and R) of two laser beams)" in the "field reception information storage unit 124" in FIG. 6. The reception information is substituted in a calculation formula ("vegetation index (NDVI)=(IR−R)/(IR+R)" in the "vegetation index calculation formula storage unit 132" to calculate "vegetation index information" of each region of the field and the vegetation index information is stored in the "field region vegetation information storage unit 133" in FIG. 7.

Subsequently, the flow proceeds to ST44. In ST44, a "protrusion checking unit (program) 134" in FIG. 7 operates to determine whether the "vegetation index information" of the field in the "field region vegetation information storage unit 133" in FIG. 7 is within the outline of the "field contour position information (the latitude and the longitude)" of the field (F-1 or the like), stored in the "server-side field-related information storage unit 111" in FIG. 5.

Figure 21:
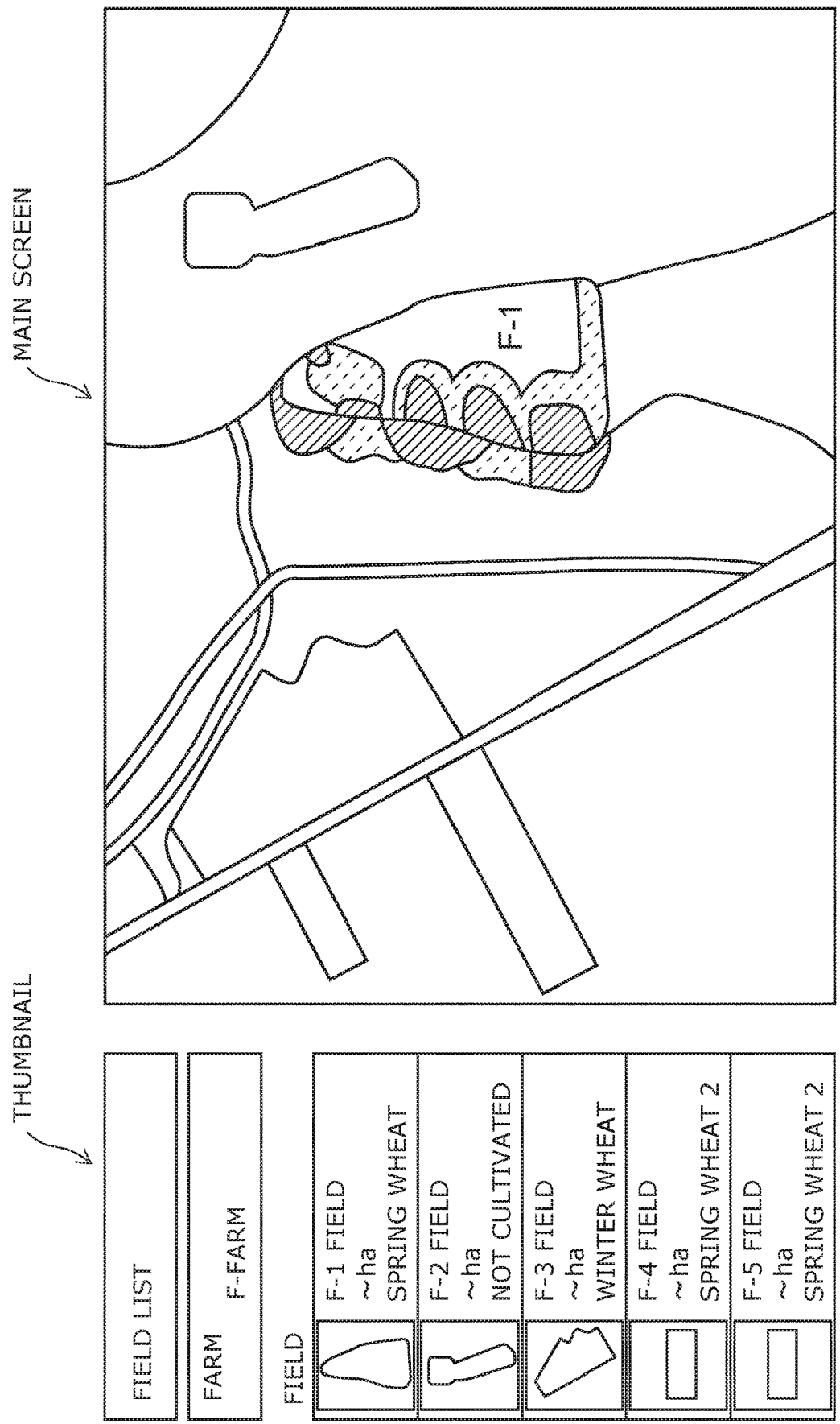
FIG. 21 is an example of a screen showing a case in which data of "vegetation index information" of a field is out of the outline of the field.

FIG. 21 is an example of a screen showing a case in which data of the "vegetation index information" of the field is not within the outline of the field. In the F-1 field in FIG. 21, a good cultivation state is depicted by "hatching with solid lines", a moderate cultivation state is depicted by "hatching with broken lines", and a poor cultivation state is depicted by "no hatching". However, as illustrated in FIG. 21, the cultivation state of a region outside the F-1 field is erroneously stored as the cultivation state data of the F-1 field. Therefore, when it is determined in ST45 that the data "is not within" the outline, the flow proceeds to ST46. In ST46, the "protrusion checking unit (program) 134" operates to remove the "vegetation index information" of the field in the "field region vegetation information storage unit 133" in FIG. 7 outside the outline of the "field contour position information (the latitude and the longitude)" of the field (F-1) and store the same as corrected vegetation index information in the "corrected vegetation index information storage unit 135" in FIG. 7.

Figure 22:
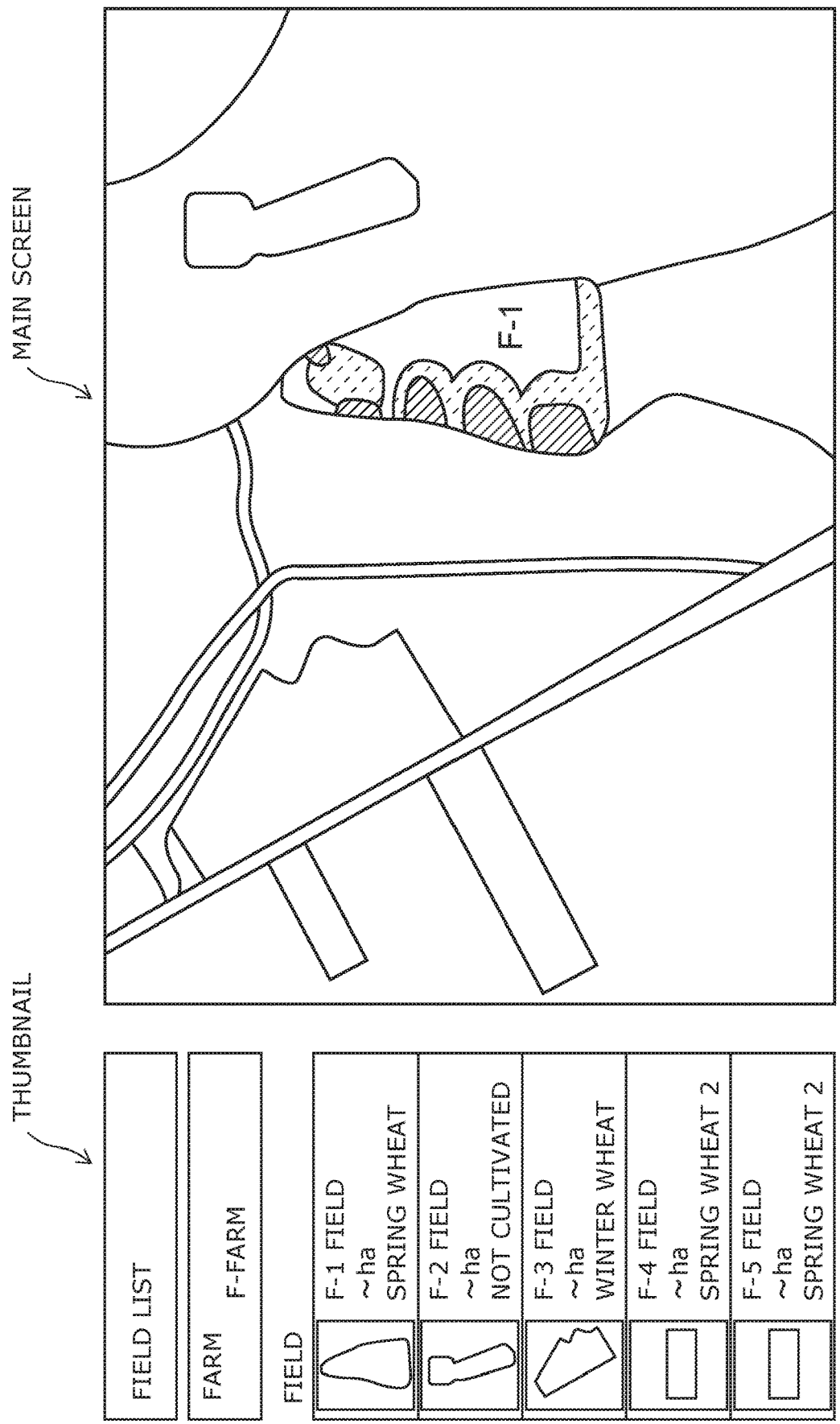
FIG. 22 is an example of a screen in which vegetation information outside the outline of an F-1 field is removed.

FIG. 22 is an example of a screen in which vegetation information outside the outline of the F-1 field is removed. As illustrated in FIG. 22, the vegetation information (cultivation information) is within the outline of the F-1 field and is displayed properly.

Subsequently, the flow proceeds to ST47. In ST47, a "cultivation map generation unit (program) 141" in FIG. 8 operates to refer to the "corrected vegetation information" in the "corrected vegetation index information storage unit 135" in FIG. 7 to classify the cultivation state into "good", "moderate", and "poor" depending on the extent of the cultivation state and display the cultivation state on the main screen by assigning "dark green (hatching with solid lines)", "standard green (hatching with broken lines)", and "light green (no hatching)" to the respective cultivation states. In this way, the cultivation map of each field is generated.

As described above, in this system 1, since it is possible to display a cultivation map showing the cultivation information of a selected field (F-1 or the like) on a screen and display differences in the extent of cultivation in different colors, the user can quickly identify the cultivation state of crops on the field.

Figure 16:
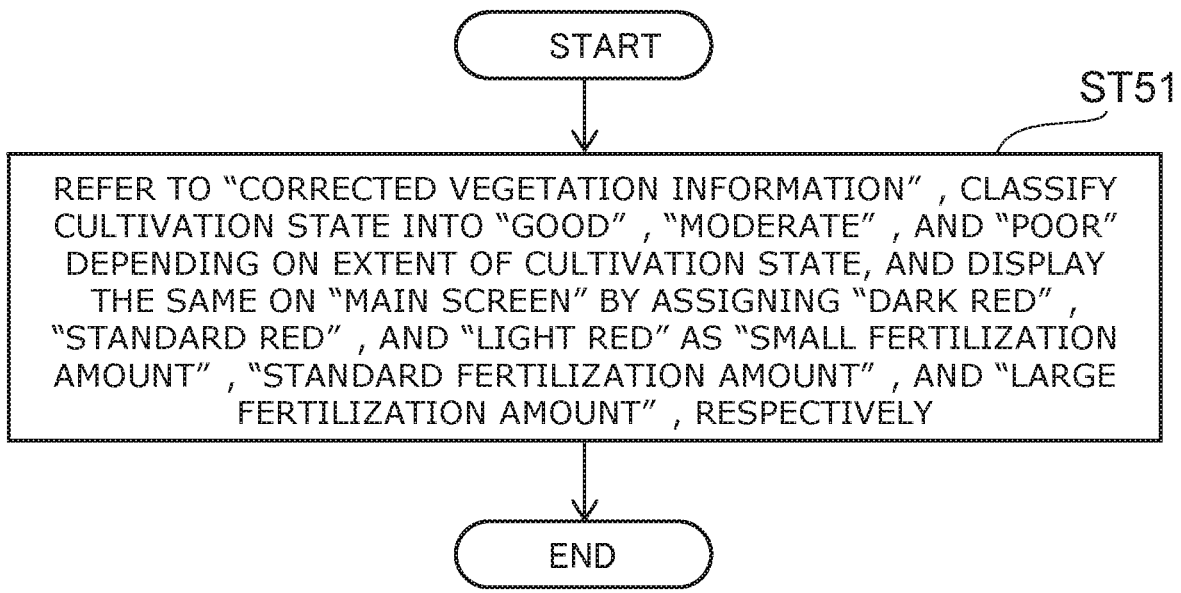
FIG. 16 is a schematic flowchart illustrating a fertilization map creation step.

Next, a fertilization map creation step for spraying a fertilizer on a field will be described. FIG. 16 is a schematic flowchart illustrating a fertilization map creation step. In ST51 in FIG. 16, a "fertilization map generation unit (program) 142" in FIG. 8 operates to refer to the "corrected vegetation information" in the "corrected vegetation index information storage unit 135" to classify the cultivation state into "good", "moderate", and "poor" depending on the extent of the cultivation state and display the cultivation state on the "main screen" by assigning "dark red", "standard red", and "light red" as "small fertilization amount", "standard fertilization amount", and "large fertilization amount", respectively. In this way, the fertilization map is generated.

Figure 23:
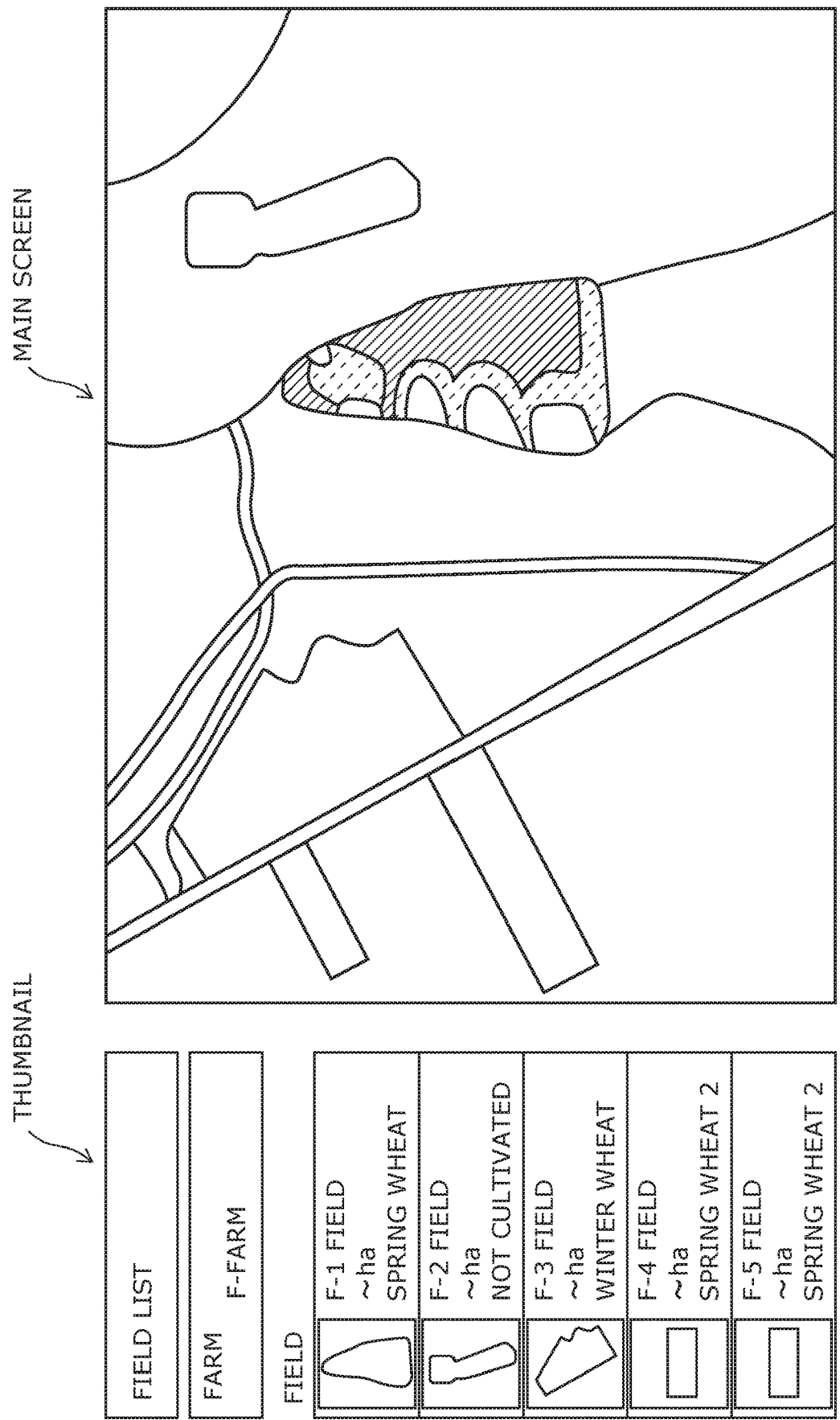
FIG. 23 is an example of a screen showing a fertilization map of a field.

FIG. 23 is an example of a screen showing a fertilization map of a field. In FIG. 23, "no hatching" corresponds to "dark red", "hatching with broken lines" corresponds to "standard red", and "hatching with solid lines" corresponds to "light red". Therefore, the user watching the "fertilization map" on the main screen can instantly understand in which region of the field (F-1) and how much fertilizer (containing nitrogen) is to be sprayed.

In the present embodiment described above, a case in which the present invention is realized as a device has been described as an example. However, the present invention is not limited thereto, but the present invention may be stored as a program executable by a computer, in a storage medium such as a magnetic disk (a Floppy (registered trademark) disk, a hard disk, or the like), an optical disk (CD-ROM, DVD, or the like), a magneto-optical disk (MO), or a semiconductor memory and be distributed.

The storage medium may be a storage medium that can store a program and that can be readable by a computer. A storage format of the storage medium is not particularly limited.

An operating system (OS) which operates on a computer on the basis of an instruction of a program installed from the storage medium in the computer, database management software, and middleware (MW) such as network software may execute part of the processes for realizing the present embodiment.

The storage medium according to the present invention is not limited to a medium independent from a computer but includes a storage medium in which a program transmitted via a LAN, the Internet, or the like is downloaded and stored or is temporarily stored.

A computer according to the present invention may execute the processes of the present embodiment on the basis of the program stored in a storage medium. The computer may be a device including one PC or the like and may be a system or the like in which a plurality of devices are connected by a network.

A computer in the present invention is not limited to the PC, but includes an arithmetic processing device, a microcomputer, or the like included in an information processing apparatus. The computer is a generic name of an apparatus and a device which can realize the functions of the present invention by a program.

Hereinabove, the embodiment of the present invention has been described. However, the present invention is not limited to the embodiment and can be changed in various ways without departing from the scope of claims.

EXPLANATION OF REFERENCE NUMERALS

1 . . . field information management system, 2 . . . Internet network, 3 . . . base station, 10 . . . tractor, 11 . . . tractor control unit, 12 . . . tractor-side communication device, 13 . . . GPS device, 14 . . . laser emitting device, 15 . . . laser receiving device, 16 . . . tractor-side information storage unit, 50 . . . terminal device, 51 . . . terminal control unit, 52 . . . terminal-side communication device, 53 . . . terminal-side display, 54 . . . terminal-side input device, 55 . . . field-related information storage unit, 56 . . . farm name information storage unit, 57 . . . laser reception information storage unit, 100 . . . management server, 101 . . . server control unit, 102 . . . server-side communication device, 103 . . . server-side display, 104 . . . server-side input device, 110 . . . first server-side information storage unit, 111 . . . server-side field-related information storage unit, 112 . . . server-side farm name information storage unit, 113 . . . server-side laser reception information storage unit, 114 . . . farm and field outline display unit, 115 . . . crop color determination unit (program), 116 . . . individual crop color information storage unit, 117 . . . field outline reducing unit, 120 . . . second server-side information storage unit, 121 . . . sub-screen field display changing unit, 122 . . . field outline changing unit, 123 . . . sub-screen outline changing unit, 124 . . . field reception information extraction unit, 125 . . . field reception information storage unit, 130 . . . third server-side information storage unit, 131 . . . vegetation index calculation unit, 132 . . . vegetation index calculation formula storage unit, 133 . . . field region vegetation information storage unit, 134 . . . protrusion checking unit, 135 . . . corrected vegetation index information storage unit, 140 . . . fourth server-side information storage unit, 141 . . . cultivation map generation unit, 142 . . . fertilization map generation unit.

What is claimed is:

1. A field information management system comprising:
a terminal device capable of displaying a main screen and a plurality of thumbnails; and
a field information management device capable of communicating with the terminal device, wherein
the field information management device is configured such that:
a plurality of fields for cultivating plants can be displayed on the main screen of the terminal device based on latitude and longitude information of the plurality of fields,
the field information management device creates an outline of each of the plurality of fields based on the latitude and longitude information for each of the plurality of fields, displays a shape of each of the plurality of fields, determines a color for each of the plurality of the fields based on individual crop color information and crop information for each respective field, and displays the respective field in the determined color,
only outlines of each of the plurality of fields displayed on the main screen are reduced by a predetermined reduction ratio, each of the reduced outlines of the plurality of fields is displayed as a respective one of the plurality of thumbnails simultaneously in correlation with a respective name of the field and a respective name of a crop in the field,
the field information management device determines whether a plurality of thumbnails is selected and only when outlines of fields of the selected plurality of thumbnails are the same and are in similar relation, and a difference between the largest field and the smallest field of the plurality of fields is outside a certain range, the outlines of the fields of the selected plurality of thumbnails are displayed with a further decreased reduction ratio,
the field information management device changes an outline of a field shown on the main screen, in response to selection of a thumbnail associated with the field shown on the main screen, to a line type different from the line type used for non-selected fields, and
when an outline of the field on the main screen is changed, the field information management device changes the shape of the field on the thumbnail corresponding to the change made to the field shown on the main screen.

2. The field information management device according to claim 1, wherein
when a field displayed in one of the plurality of thumbnails is selected, cultivation information and/or fertilization information is displayed on the corresponding field displayed on the main screen.

3. The field information management device according to claim 2, wherein
the cultivation information and/or the fertilization information is displayed such that a difference in an extent of cultivation and/or a difference in an extent of a fertilization amount is displayed in a different color.

4. A field information management method comprising:
creating an outline for each of a plurality of fields based on latitude and longitude information for each of the plurality of fields;
displaying a shape of each of the plurality of fields for cultivating plants on a main screen of a terminal device based on latitude and longitude information of the plurality of fields;
determining a color for each of the plurality of fields based on individual crop color information and crop information for each respective field;
displaying each respective field in the determined color;
reducing, by a predetermined reduction ratio, the size of only outlines of each of the plurality of fields displayed as a respective one of a plurality of thumbnails simultaneously in correlation with a respective name of the field and a respective name of a crop in the field;
determining whether a plurality of thumbnails is selected and only when outlines of fields of the selected plurality of thumbnails are the same and are in similar relation, and a difference between the largest field and the smallest field of the plurality of fields is outside a certain range, the outlines of the fields of the selected plurality of thumbnails are displayed with a further decreased reduction ratio;

changing an outline of a field shown on the main screen, in response to selection of a thumbnail associated with the field shown on the main screen, to a line type different from the line type used for non-selected fields; and changing the shape of the field on the thumbnail in response to a change made to the respective field shown on the main screen when an outline of the respective field on the main screen is changed.

5. A non-transitory computer readable medium storing computer program instructions for field information management, which, when executed on a processor, cause the processor to perform operations comprising:

creating an outline for each of a plurality of fields based on latitude and longitude information for each of the plurality of fields;

displaying a shape of each of the plurality of fields for cultivating plants on a main screen of a terminal device based on latitude and longitude information of the plurality of fields;

determining a color for each of the plurality of fields based on individual crop color information and crop information for each respective field;

displaying each respective field in the determined color;

reducing, by a predetermined reduction ratio, only outlines of each of the plurality of fields displayed as a respective one of a plurality of thumbnails simultaneously in correlation with a respective name of the field and a respective name of a crop in the field;

determining whether a plurality of thumbnails is selected and only when outlines of fields of the selected plurality of thumbnails are the same and are in similar relation, and a difference between the largest field and the smallest field of the plurality of fields is outside a certain range, the outlines of the fields of the selected plurality of thumbnails are displayed with a further decreased reduction ratio;

changing an outline of a field shown on the main screen, in response to selection of a thumbnail associated with the field shown on the main screen, to a line type different from the line type used for non-selected fields; and changing the shape of the field on the thumbnail in response to a change made to the respective field shown on the main screen when an outline of the respective field on the main screen is changed.

* * * * *